US010846289B2

(12) United States Patent
Wang et al.

(10) Patent No.: US 10,846,289 B2
(45) Date of Patent: *Nov. 24, 2020

(54) BIDIRECTIONAL CROSS-FILTERING IN ANALYSIS SERVICE SYSTEMS

(71) Applicant: MICROSOFT TECHNOLOGY LICENSING, LLC, Redmond, WA (US)

(72) Inventors: Yutong Wang, Clyde Hill, WA (US); Anand Bheemarajaiah, Redmond, WA (US); Xiaoqing Tang, Redmond, WA (US); Srinivasan S. Turuvekere, Redmond, WA (US); Howard J. Dickerman, Bellevue, WA (US); Marius Dumitru, Sammamish, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 282 days.

This patent is subject to a terminal disclaimer.

(21) Appl. No.: 15/900,514

(22) Filed: Feb. 20, 2018

(65) Prior Publication Data
US 2018/0173752 A1    Jun. 21, 2018

Related U.S. Application Data

(63) Continuation of application No. 14/737,338, filed on Jun. 11, 2015, now Pat. No. 9,922,081.

(51) Int. Cl.
G06F 16/00 (2019.01)
G06F 16/2453 (2019.01)

(52) U.S. Cl.
CPC .............................. *G06F 16/2453* (2019.01)

(58) Field of Classification Search
CPC .......... G06F 16/2453; G06F 16/24562; G06F 16/248; G06F 16/00; G06F 40/18; G06F 17/00; G06G 16/245
See application file for complete search history.

(56) References Cited

U.S. PATENT DOCUMENTS

2003/0041069 A1* 2/2003 Yorke ............... G06F 16/24562
2003/0177139 A1* 9/2003 Cameron ................ G06F 16/81
(Continued)

*Primary Examiner* — Anh Ly
(74) *Attorney, Agent, or Firm* — Shook, Hardy & Bacon, LLP

(57) ABSTRACT

In various embodiments, methods and systems for cross-filtering based on configurable direct relationships are provided. A selection of a first endpoint of a first table and a second endpoint of a second table is received. A direct relationship object is configured between the first table and the second table based on the first endpoint and the second endpoint. A cross-filtering direction and endpoint cardinality settings can also be configured for the direct relationship object. The direct relationship object may be configured as a many-to-one, one-to-many, or one-to-one. Automatic cross-filtering is configurable and can be set to cross-filter in one direction, the reverse direction, or both directions, with bidirectional cross filtering being a default configuration. The direct relationship object between the first endpoint and the second is configurable, such that, cross-filtering the first table and the second table to select rows for cross-filtering results is based on the cross-filtering direction.

20 Claims, 12 Drawing Sheets

(56) References Cited

U.S. PATENT DOCUMENTS

| | | | |
|---|---|---|---|
| 2009/0313268 A1* | 12/2009 | Folting | G06F 16/2445 |
| 2010/0262625 A1* | 10/2010 | Pittenger | G06F 21/604 |
| | | | 707/783 |
| 2011/0087954 A1* | 4/2011 | Dickerman | G06F 40/18 |
| | | | 715/219 |
| 2012/0233217 A1* | 9/2012 | Purpus | G06Q 10/06 |
| | | | 707/792 |
| 2012/0317093 A1* | 12/2012 | Teletia | G06F 16/2456 |
| | | | 707/714 |
| 2012/0323958 A1* | 12/2012 | Dickerman | G06F 16/2448 |
| | | | 707/769 |

* cited by examiner

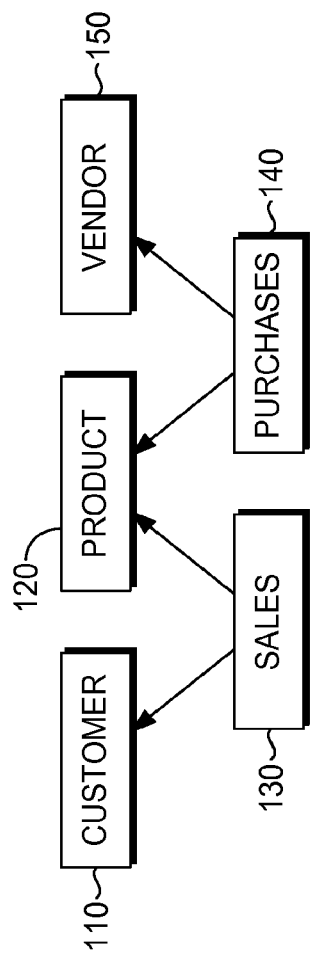
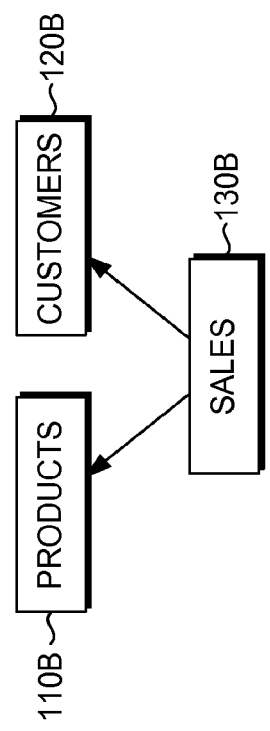
FIG. 1A
FIG. 1B

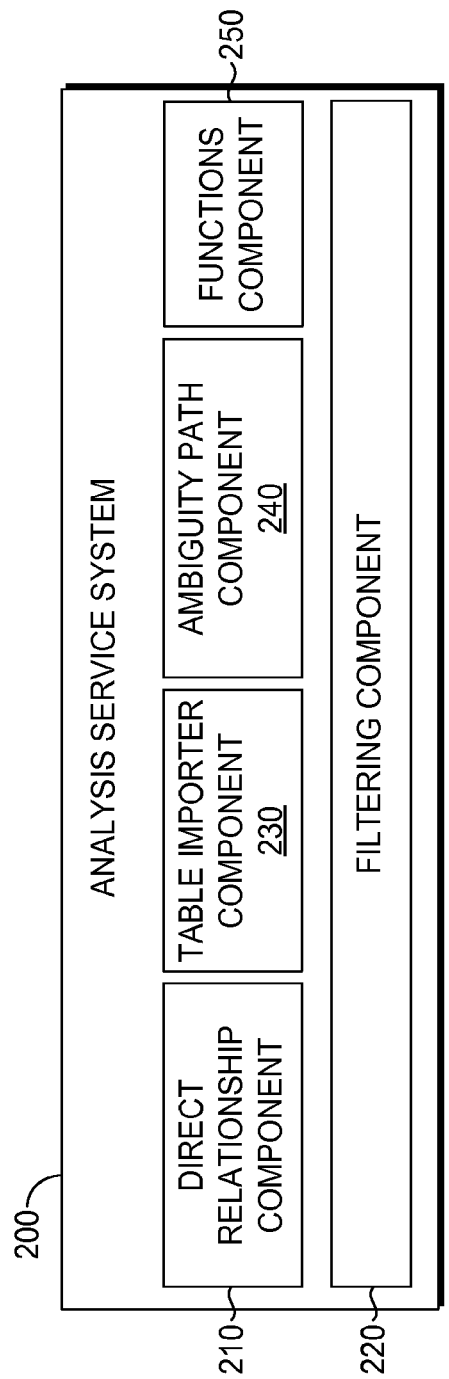

Customer

| CustID  | Name         | City        |
|---------|--------------|-------------|
| Cust100 | Customer 100 | Boston      |
| Cust200 | Customer 200 | Seattle     |
| Cust300 | Customer 300 | Chicago     |
| Cust400 | Customer 400 | New York    |

Vendor

| VendID  | Name       | City        |
|---------|------------|-------------|
| Vend100 | Vendor 100 | Los Angeles |
| Vend200 | Vendor 200 | San Diego   |
| Vend300 | Vendor 300 | Boston      |
| Vend400 | Vendor 400 | Seattle     |

Product

| ProdID  | Description | Color  |
|---------|-------------|--------|
| Prod100 | Product 100 | Blue   |
| Prod200 | Product 200 | Red    |
| Prod300 | Product 300 | Yellow |
| Prod400 | Product 400 | Green  |

Sales

| Date      | CustID  | ProdID  | Sales Qty | Sales Amt |
|-----------|---------|---------|-----------|-----------|
| 6/20/2012 | Cust100 | Prod100 | 100       | $253.87   |
| 6/20/2012 | Cust200 | Prod200 | 90        | $224.23   |
| 6/20/2012 | Cust300 | Prod300 | 80        | $214.56   |
| 6/20/2012 | Cust100 | Prod400 | 70        | $223.01   |
| 6/20/2012 | Cust200 | Prod100 | 60        | $176.12   |
| 6/22/2012 | Cust300 | Prod200 | 50        | $145.63   |
| 6/22/2012 | Cust100 | Prod300 | 40        | $117.21   |
| 6/22/2012 | Cust200 | Prod400 | 30        | $109.17   |
| 6/22/2012 | Cust300 | Prod100 | 20        | $65.80    |
| 6/22/2012 | Cust100 | Prod200 | 10        | $39.35    |

Purchases

| Date      | VendID  | ProdID  | Purchase Qty | Purchase Amt |
|-----------|---------|---------|--------------|--------------|
| 6/18/2012 | Vend100 | Prod100 | 100          | $199.20      |
| 6/18/2012 | Vend200 | Prod200 | 90           | $181.76      |
| 6/18/2012 | Vend300 | Prod300 | 80           | $127.96      |
| 6/18/2012 | Vend100 | Prod400 | 70           | $125.51      |
| 6/18/2012 | Vend100 | Prod100 | 60           | $97.98       |
| 6/21/2012 | Vend200 | Prod200 | 50           | $103.17      |
| 6/21/2012 | Vend300 | Prod300 | 40           | $105.56      |
| 6/21/2012 | Vend100 | Prod400 | 30           | $65.26       |
| 6/21/2012 | Vend100 | Prod100 | 20           | $46.08       |
| 6/21/2012 | Vend200 | Prod200 | 10           | $25.12       |

WRONG

| Customer | Sales | Distinct Colors |
|---|---|---|
| Customer100 | $633.44 | 4 |
| Customer200 | $509.52 | 4 |
| Customer300 | $425.99 | 4 |
| Customer400 | | 4 |
| Grand Total | $1,568.95 | 4 |

560

EXPECTED

| Customer | Sales | Distinct Colors |
|---|---|---|
| Customer100 | $633.44 | 4 |
| Customer200 | $509.52 | 3 |
| Customer300 | $425.99 | 3 |
| Grand Total | $1,568.95 | 4 |

570

WRONG

| Product | Customers | Vendors |
|---|---|---|
| Product100 | 4 | 4 |
| Product200 | 4 | 4 |
| Product300 | 4 | 4 |
| Product400 | 4 | 4 |
| Grand Total | 4 | 4 |

580

EXPECTED

| Product | Customers | Vendors |
|---|---|---|
| Product100 | 3 | 1 |
| Product200 | 3 | 1 |
| Product300 | 2 | 1 |
| Product400 | 2 | 1 |
| Grand Total | 3 | 3 |

FIG. 5B

| City | Population |
|---|---|
| Aberdeen | 16008 |
| Albion | 582 |
| Algona | 2814 |
| Anacortes | 16933 |
| Bellevue | 126626 |
| Benton City | 3013 |
| Blaine | 5062 |
| Bonney Lake | 10651 |

| City | County | Location Code | Local Rate | State Rate | Combined Sales Tax |
|---|---|---|---|---|---|
| Aberdeen | Grays Harbor | 1401 | 0.019 | 0.065 | 0.084 |
| Albion | Whitman | 3801 | 0.013 | 0.065 | 0.078 |
| Algona | King | 1701 | 0.03 | 0.065 | 0.095 |
| Anacortes | Skagit | 2901 | 0.017 | 0.065 | 0.082 |
| Bellevue | King | 1704 | 0.03 | 0.065 | 0.095 |
| Benton City | Benton | 301 | 0.018 | 0.065 | 0.083 |
| Blaine | Whatcom | 3702 | 0.02 | 0.065 | 0.085 |
| Bonney Lake | Pierce | 2701 | 0.029 | 0.065 | 0.094 |

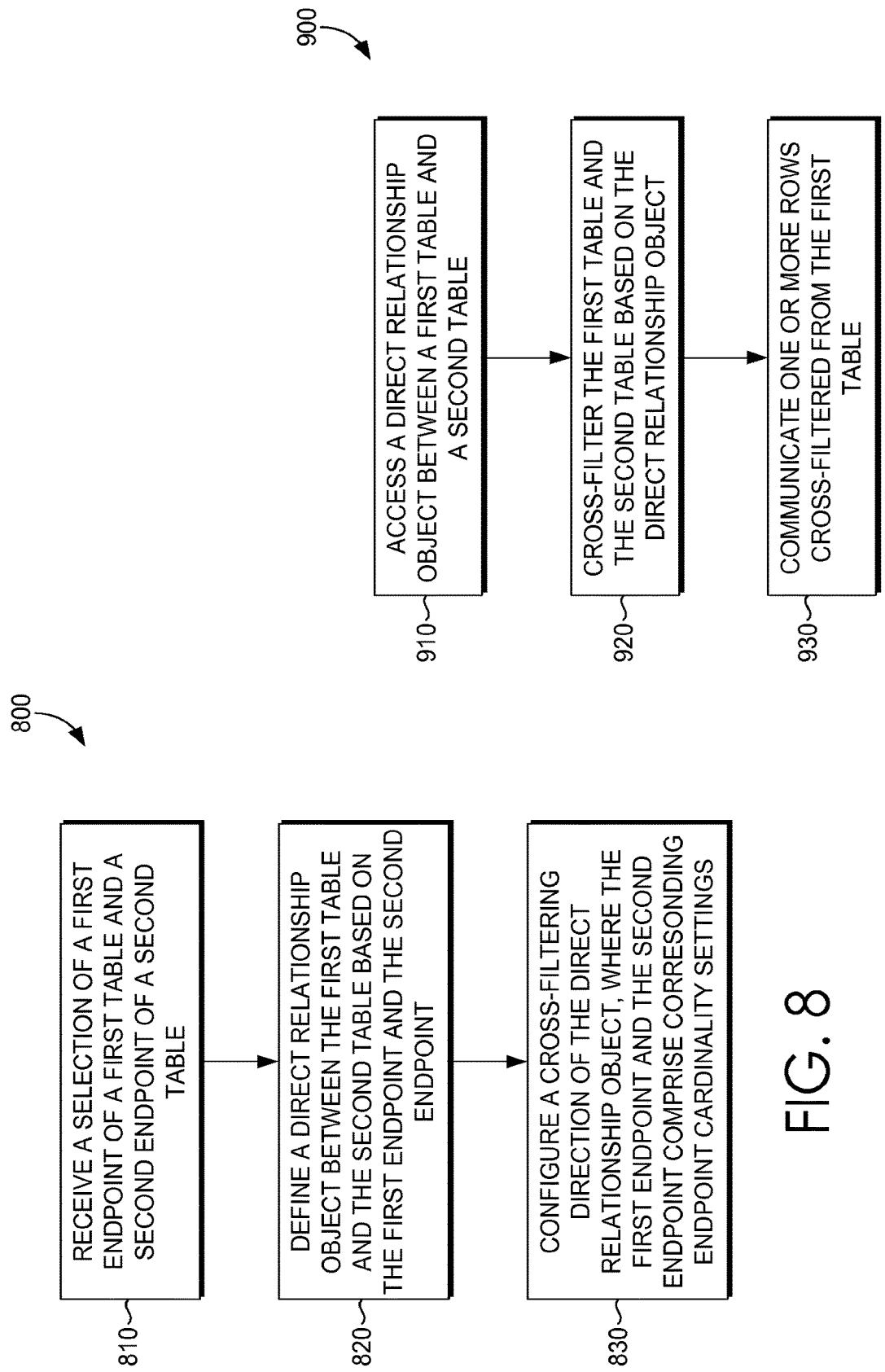

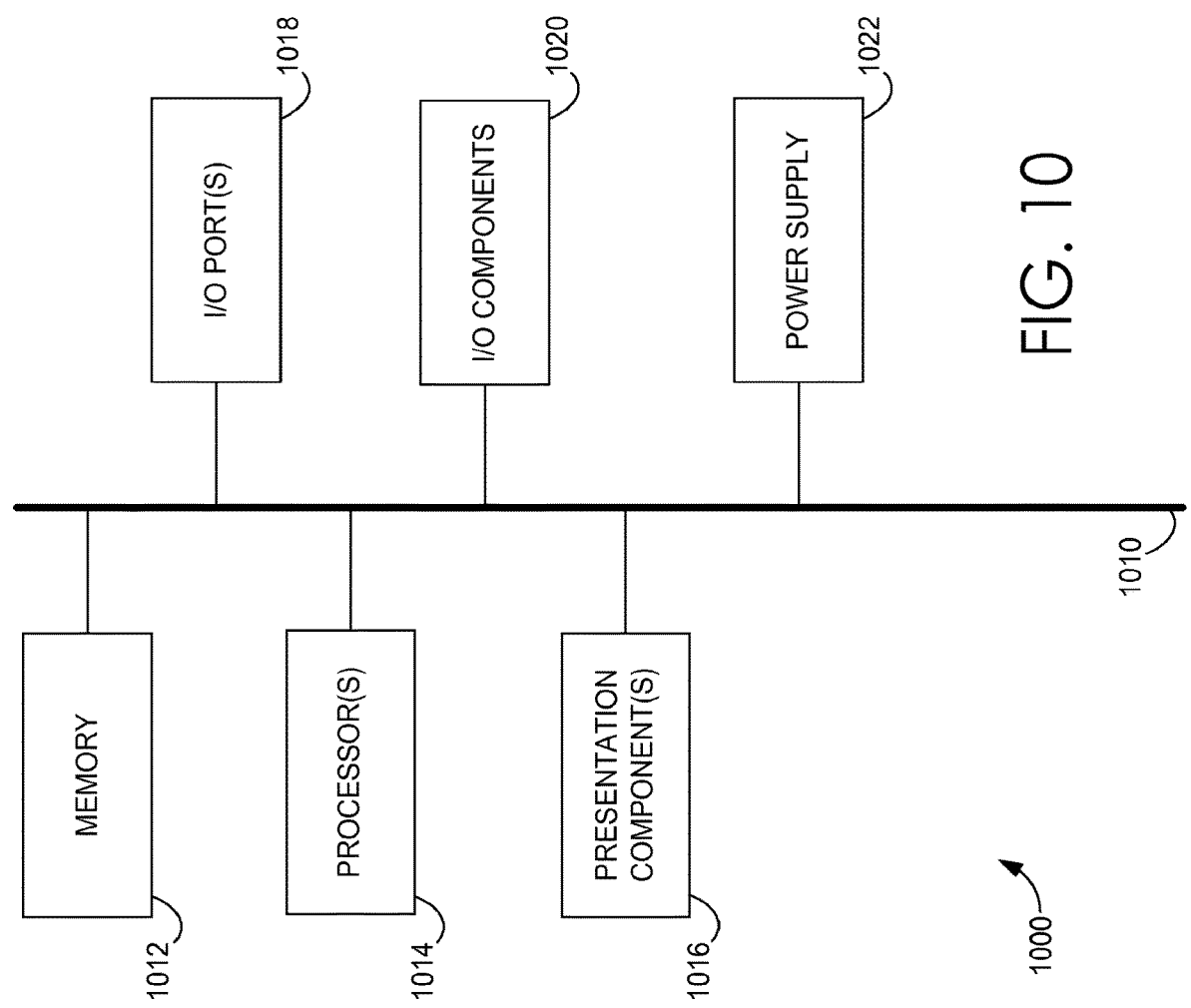

BIDIRECTIONAL CROSS-FILTERING IN ANALYSIS SERVICE SYSTEMS

CROSS-REFERENCE TO RELATED APPLICATIONS

This application is a continuation of co-pending U.S. patent application Ser. No. 14/737,338, filed Jun. 11, 2015, and entitled "BIDIRECTIONAL CROSS-FILTERING IN ANALYSIS SERVICE SYSTEMS," the entire contents of which is hereby incorporated by reference in its entirety.

BACKGROUND

Analysis service systems support analyzing data for discovery and communication of meaningful patterns in the data. In particular, analysis service systems can facilitate identifying meaning from data stored in relational databases where the data are stored based on a relational model. Analysis service systems can implement different types of operations on data to generate data visualizations. Specifically, a filtering operation, for table data, can retain the rows for which some filter condition is true and eliminate other rows. A filter condition can be simply based on a column field containing a specific value or more complex implementations involving multiple fields. Developing analysis service tools can support different types of operations for data visualization and can facilitate building models that produce the desired results for data in a database.

SUMMARY

This summary is provided to introduce a selection of concepts in a simplified form that are further described below in the detailed description. This summary is not intended to identify key features or essential features of the claimed subject matter, nor is it intended to be used in isolation as an aid in determining the scope of the claimed subject matter.

Embodiments described herein are methods, computer-storage media, and systems for cross-filtering based on configurable direct relationships. A selection of a first endpoint of a first table and a second endpoint of a second table is received. A direct relationship object is configured between the first table and the second table based on the first endpoint and the second endpoint. A cross-filtering direction and endpoint cardinality settings can also be configured for the direct relationship object. The direct relationship object may be configured as a many-to-one, one-to-many, or one-to-one. Automatic cross-filtering is configurable and can be set to cross-filter in one direction, the reverse direction, or both directions, with bidirectional cross filtering being a default configuration. The direct relationship object between the first endpoint and the second is configurable, such that, cross-filtering behavior is based on the cross-filtering direction.

In operation, cross-filtering based on configurable direct relationships comprises accessing the direct relationship object between the first table and the second table. Cross-filtering the first table or the second table can be based on the direct relationship object having a cross-filtering direction. Cross-filtering comprises selecting one or more rows from the first table, wherein selecting the one or more rows is based on a filter in the second table, wherein the filter corresponds to a column value. The one or more of the first table can be communicated as cross-filtering results.

BRIEF DESCRIPTION OF THE DRAWINGS

The present invention is described in detail below with reference to the attached drawing figures, wherein:

FIGS. 1A and 1B are exemplary tables in which embodiments described herein may be employed;

FIG. 2 is a schematic of an exemplary analysis service system, in accordance with embodiments described herein;

FIG. 4 illustrates data for an exemplary application of a method of cross-filtering based on configurable direct relationships, in accordance with embodiments described herein;

FIGS. 5A and 5B illustrate a slicer user interface and pivot tables for a method of cross-filtering based on configurable direct relationships, in accordance with embodiments described herein;

FIG. 8 is a flow diagram showing a method of cross-filtering based on configurable direct relationships, in accordance with embodiments described herein;

FIG. 9 is a flow diagram showing a method of cross-filtering based on configurable direct relationships, in accordance with embodiments described herein; and FIG. 10 is a block diagram of an exemplary computing environment suitable for use in implementing embodiments described herein.

DETAILED DESCRIPTION

Figure 3A:
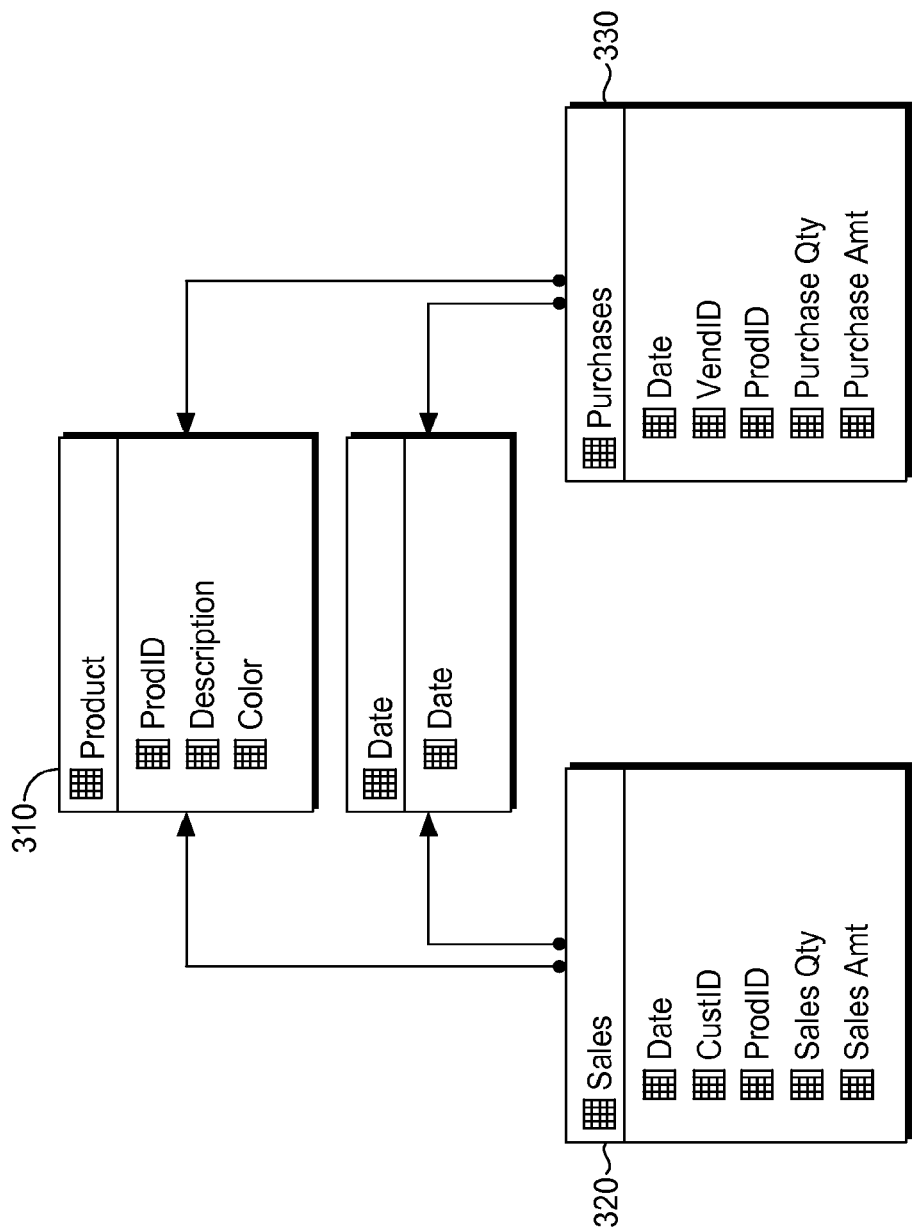
FIGS. 3A and 3B illustrate exemplary scenarios for ambiguity paths in an analysis service system, in accordance with embodiments described herein.

The subject matter of embodiments of the invention is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

For purposes of this disclosure, the word "including" has the same broad meaning as the word "comprising," and the word "accessing" comprises "receiving," "referencing," or "retrieving." In addition, words such as "a" and "an," unless otherwise indicated to the contrary, include the plural as well as the singular. Thus, for example, the constraint of "a feature" is satisfied where one or more features are present. Also, the term "or" includes the conjunctive, the disjunctive, and both (a or b thus includes either a or b, as well as a and b).

For purposes of a detailed discussion below, embodiments are described with reference to an analysis service system; the analysis service system can implement several components for performing the functionality of embodiments described herein. Components can be configured for performing novel aspects of embodiments, where "configured for" comprises "programmed to" perform particular tasks or implement particular abstract data types using code. It is contemplated that the methods and systems described herein can be performed in different types of operating environments having alternate configurations of the functional components. As such, the embodiments described herein are merely exemplary, and it is contemplated that the techniques may be extended to other implementation contexts.

Analysis service systems (e.g., MICROSOFT SQL SERVER ANALYSIS SERVICES) support discovery and communication of meaningful patterns in data. In particular, analysis service systems can facilitate identifying meaning from data stored in relational databases where the data are stored based on a relational model. Analysis service systems can implement different types of operations on data to generate data visualizations. Specifically, a filtering operation for table data can retain the rows for which some filter condition is true and eliminate other rows. A filter condition can be simply based on a column field containing a specific value or more complex implementations involving multiple fields. Further, a cross-filtering operation can include eliminating some rows of a table and retaining others because of a filter in a different (related) table. Analysis service systems can cross-filter data based on relationships between tables; however cross-filtering operations can involve authoring complex measure formulas that perform the appropriate cross-filtering across a set of table relationships. Such calculations can be difficult to author because it is necessary to apply the complex calculation logic to each and every measure defined in the model. Conventional attempts to resolve cross-filtering issue have resulted in catch-all implementations that are not configurable or adaptable for various scenarios and further can be limited to particular types of schema configurations. As such, developing analysis service tools that can support different types of operations for data visualization and schemas can facilitate building models that produce the desired results for data in a database.

Embodiments described herein provide simple and efficient methods and systems for cross-filtering data based on an analysis service having a configurable direct relationship object between tables. At a high level, an analysis service can include a configurable direct relationship object; the configurable direct relationship object can include a cross-filtering direction. The cross-filtering direction can be specified as part of the database schema or database definition. Each direct relationship can be configured with two endpoints, and each endpoint may contain unique values or each endpoint may contain duplicate values. The configured direct relationship may be considered as a many-to-one, one-to-many, or one-to-one. Automatic cross-filtering is configurable and can be set to cross-filter in one direction, the reverse direction, or both directions, with bidirectional cross filtering being one of two possible default configurations. The default can be either bi-directional, or one-directional where a filter on the one side cross-filters the many side. Moreover, embodiments described herein support a diamond shaped schema and are not limited to star schemas. As such, the configurable direct relationship obviates authoring of complex formulas that can be difficult to author and required applying complex calculation logic to each and every measure defined in a relational model.

Embodiments described herein can distinguish between conceptual relationship between tables and direct relationships between tables, the direct relationships which are specifically configurable features for tables with components and operations described herein. By way of background, a many-to-many relationship between tables can refer to a relationship between two entities in which a first entity comprises a first parent record for which there are many corresponding children records associated with a second entity, and the second entity comprises a second parent record for which there are many corresponding children records associated with the first entity.

With reference to FIG. 1A, a relationship between a Customer 110 and Product 120 table can be many-to-many because each customer buys many products and each product is sold to many customers. Also the relationship between Sales 130 and Purchases 140 can be a many-to-many relationship because there are many sales for a given product that can be mapped to many purchases for the same product. It is conceptually possible to create many-to-many relationships between Sales 130 and Purchases 140 on a Product ID column that is present in both tables, and also a Customer 110 and Purchases 140 or between Vendor 150 and Sales 130. Conventional analysis services can support the notion of multi-dimensional models that enable users to slice (or filter) measure group aggregations by a dimension that is not directly related to the measure grouped being slice.

Various terms are used throughout this description. Although more details regarding various terms are provided throughout this description, general definitions of some terms are included below to provider a clearer understanding of the ideas disclosed herein:

Filtering refers to, for table of data, retaining the rows for which some filter condition is true, and eliminating other rows. Most often the filter condition is very simple, based on a field (column) containing a specific value, but filter conditions can also be more complex, involving multiple fields, and various operations.

Cross-Filtering refers to eliminating some rows of a table and retaining others because of a filter in a different (related) table. For example, whenever there exists a many-to-one relationship, any filter, applied to a table on the one-side of the relationship, will automatically cross-filter the table on the many-side of the relationship.

A junction table or bridge table refers to a table in the middle of conceptual many-to-many relationships that are based on traversing a pair of many-to-one relationships. With reference to FIG. 1A, the Sales 130 table can be a junction table between Customer 110 and Product 120, and the presence of this junction table that effectively creates the conceptual many-to-many relationship between Customer 110 and Product 120.

An endpoint can refer to a single column in a table. It is contemplated that embodiments described herein can be implemented with endpoints comprising multiple columns. (e.g., a composite key). Each direct relationship in the schema can be configured with two endpoints. In particular, each endpoint corresponds to a separate table. Even though a relationship between a pair of tables exists and can be discussed as such, a relationship can specifically be between a column or a set of columns in the first table and a column or a set of columns in the second table. As previously mentioned, direct relationships do not have a directional attribute or in other words an inherent sense of direction. Direct relationships are between the two endpoints and the direction of the relationship is not directionally defined. However, the direction of the cross-filtering is different. In this regard, practically a focus can be on the directionality of cross-filtering and not the directionality of the relationship.

An endpoint can include a cardinality of one when the relationship maps any value from the other endpoint to a single value in this endpoint. An endpoint has a cardinality of many when the relationship maps any value from the other endpoint to more than one value in the endpoint. Cardinality of an endpoint can typically be one when the column of the endpoint is unique. An initial cardinality can be determined by examining the data within that column, but this can be a settable property, because the analysis service supports settings that reflect what the contents of the column might look like, rather than what the contents of the column happens to be at a specific moment.

In operation, the analysis service system supports direct relationship objects between tables. A pair of tables can have one of three possible relationship referred to as a relationship setting. A relationship setting can be configured by a direct relationship component (e.g., a data modeler). The relationship setting can be one of: (1) when Table1 is filtered, Table2 will be cross-filtered; (2) when Table2 is filtered, Table1 will be cross-filtered; and (3) when either table is filtered, the other table will be cross-filtered (e.g. cross-filter in both directions). A default relationship setting can be anyone one of the three relationship settings. Embodiments disclosed herein can advantageously implement the default relationship setting as cross-filtering in both directions. The data modeler can have the option to choose any of the three settings.

It is contemplated that a default cross-filtering setting associated with a relationship can be overridden. By way of example, users can invoke the functions (e.g., CROSSFILTER( ) or CROSSFILTERALL( ) function—described herein in more detail) to set cross-filtering for a specific relationship or for all relationships. Functions described herein can refer to data analysis expressions (DAX) that power analysis service products. DAX is a formula language with function components that can be used to define custom calculations designed to work with relational data and perform dynamic aggregation. It is also contemplated that for a query or report, it can be possible for the query to specify cross-filtering behavior for the duration of the query. This can be done by wrapping the table expressions associated with a query in one of the following exemplary constructs: (1) CALCULATETABLE(<Table Expression>, CROSSFILTERALL( )); (2) CALCULATETABLE(<Table Expression>, CROSSFILTER(columnName1, columnName2 [,direction])).

Cross-filtering can be set in any direction for any single relationship and also have a single invocation that sets cross-filtering for all relationships to be in both directions. The cross-filtering feature in the analysis service is supported with granularity when setting cross-filtering direction for a single relationship, however, the same level of granularity is not required when setting cross-filtering direction for all relationships at once.

In embodiments described herein, applying cross filtering is not performed until/unless there is a filtering operation performed on one of the tables. By way of example, consider the schema in FIG. 1B with three tables: Products 110B, Customers 120B and Sales 130B. Consider that an analysis service has placed settings in the schema such that all filters automatically cross-filter every other table. Further, consider that there are 100 products, but only 90 of them have sales transactions. There are 100 customers, but only 90 of them have sales transactions. If a query is executed for the number of products when there are no filters, an expected query result would be to get a result of 100 products. If a query is executed for the number products sold to a specific set of customers, an expected query result is a subset of the 90 products. If the analysis service cross-filters all the time, even when there is no filter applied to either side, query result would not include the 10 products that are never sold, and the 10 customers who have not yet made purchases. As such, with embodiments described herein the analysis service configures tables such that when a table is filtered, then the analysis service will consider applying cross-filtering to related tables. When no filter has been applied, there is no cross-filtering. From a technical standpoint, the analysis service can cross-filter only when a functional evaluation (e.g., ISFILTERED( )) evaluates to TRUE.

Further is it is contemplated that a set of rules can be implemented to address ambiguity in paths for cross-filtering between tables. Ambiguous paths exists when more than one path between a pair of table exist that causes potential ambiguity as to how to evaluate queries. An analysis service (e.g., ambiguity path component) can reduce or eliminate ambiguity n the model in advance of any reporting scenario. When analysis service does not provide information to disambiguate the model, the ambiguity path component can recommend choices about paths to follow. Selected paths can be explicitly selected, recommend paths can be based on rules, arbitrary paths can be paths selected by the analysis service without high confidence in correctness of choice. Arbitrary paths can include warning to users. Conflicting paths are selected paths that introduce ambiguity errors.

Embodiments of the present disclosure can be further described based on specific use cases, as described herein in more detail, including cross-filtering direction use case, direct many-to-many relationship use case, cross-filter path ambiguity use case, and merging tables use case. Claimed embodiments, however, can include the following:

In a first embodiment described herein, one or more computer storage media having computer-executable instructions embodied thereon that, when executed, by one or more processors, causes the one or more processors to perform a method for cross-filtering based on configurable direct relationships is provided. The method includes receiving a selection of a first endpoint of a first table and a second endpoint of a second table. The method includes defining a direct relationship object between the first table and the second table based on the first endpoint and the second endpoint. The method also includes configuring a cross-filtering direction of the direct relationship object, such that, cross-filtering the first table and the second table, to select rows for cross-filtering results, is based on the cross-filtering direction. The first endpoint and the second point comprise corresponding endpoint cardinality settings.

In a second embodiment described herein, a computer-implemented method for cross-filtering based on configurable direct relationships is provided. The method includes accessing a direct relationship object between a first table and a second table. The direct relationship object comprises a configurable cross-filtering direction. The method also includes cross-filtering the first table and the second table based on the direct relationship object and the configurable cross-filtering direction. Cross-filtering the first table and the second table comprises selecting one or more rows of the first table. Selecting the one or more rows is based on a filter in a second table, where the filter corresponds to a column value. The method further includes communicating the one or more rows of the first table.

In a third embodiment described herein, a system for cross-filtering based on configurable direct relationships is provided. The system comprises a direct relationship component configured for: receiving a selection of a first endpoint of a first table and a second endpoint of a second table; defining a direct relationship object between the first table and the second table based on the first endpoint and the second endpoint, and configuring a cross-filtering direction of the direct relationship object, such that cross-filtering the first table and the second table to select rows for cross-filtering results is based on the cross-filtering direction, wherein the first endpoint and the second point comprise corresponding endpoint cardinality settings. The system further includes a filtering component configured for: accessing the direct relationship object between a first table and a second table; and cross-filtering the first table and the second table based on the direct relationship object and the configurable cross-filtering direction, wherein cross-filtering comprises selecting one or more rows of the first table, wherein selecting the one or more rows is based on a filter in a second table, wherein the filter corresponds to a column value.

Referring now to FIG. 2, FIG. 2 illustrates an exemplary analysis service system 200 in which implementations of the present disclosure may be employed. In particular, FIG. 2 shows a high level architecture of analysis service system. It should be understood that this and other arrangements described herein are set forth only as examples. Other arrangements and elements (e.g., machines, interfaces, functions, orders, and groupings of functions, etc.) can be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by one or more entities may be carried out by hardware, firmware, and/or software. For instance, various functions may be carried out by a processor executing instructions stored in memory.

Analysis service system 200 can be implemented to support configuration direct relationship objects between tables. Analysis service system can include a computing platform (e.g., a hardware architecture and software framework) with components that facilitate configuring direct relationships between tables that facilitate cross-filtering data. In operation, an analysis service system can support a direct relationship object between two tables where the direct relationship object can be one of: a one-one, many-to-one, and one-to-many relationship.

Cross-filtering between a pair of tables can be set based on predefined conditions. The cross-filtering setting can be assigned using a user interface. Predefined conditions can include if the first table having a first endpoint is filtered, the second table having a second endpoint is cross-filtered; the second table having the second endpoint is filtered, the first table having the second endpoint is cross-filtered; and if either the first table or the second table is filtered, the first table and the second table are cross-filtered (i.e., in both directions).

Endpoints (columns used as endpoints) may have cardinality of one or many indicating that the endpoint maps incoming relationships to single values or multiple values. The cardinality setting can be less restrictive than the data currently contained in the endpoint's column. For example, an endpoint may be marked as many even though it happens to contain unique values, although this may adversely impact performance.

The analysis service system 200 can also operate with certain defaults for relationship and cross-filtering. For example, when upgrading from older models, relationships and cross-filtering may not be changed. Relationships from earlier versions can be configured many-to-one with cross-filtering from one-side to the many-side (the many-side being cross-filtered by the one-side).

With embodiments described herein, when creating new relationships a preference for a many-to-one, one-to-one, or one-to-many relationship can be indicated. Any setting can be configured as a desired default. A one-to-one relationship setting is possible when there are no duplicate values in the endpoint columns; the presence of duplicate values requires that the endpoint cardinality be many. It is contemplated that the analysis service system can include interface elements that instruct a user to follow the above-defined preferences for generating models. It is further contemplated that when creating new relationships, a cross-filtering setting can be bidirectional by default or one-directional, where the one side cross-filters the many side. A one-directional setting in the other direction is also possible. An interface can allow user to change default settings at any time.

The analysis service system 200 can also support measure formulas having cross-filtering settings. Measure formulas can include additional cross-filtering settings that are not available using a user interface. Condition-based cross-filtering settings for measure formulas include: if a first table having a first endpoint is filtered, a second table having a second endpoint is cross-filtered; if the second table having the second endpoint is filtered, the first table having the first endpoint is cross-filtered; if either the first table or the second table is filtered, the first table or the second table will be cross-filtered (i.e., cross-filter in both directions); if either the first table or the second table is filtered, the first table or the second table will not be cross-filtered, and the cross-filtering setting associated with the relationship (i.e., schema setting) is utilized.

Among other components not shown, analysis service system 200 includes a direct relationship component 210, a filtering component 220, a table importer component 230, an ambiguous path component 240, a functions component 250, and a client device (not shown). The analysis service system can include hardware inventory that comprises different types of computing devices, each computing device resides on any type of computing device, which may correspond to computing device 1000 described with reference to FIG. 10, for example. A client device may include one or more portions of the analysis service system 200 or provide access to an instance of an analysis service system. The components of the analysis service system 200 may communicate with each other over a network (not shown), which may include, without limitation, one or more local area networks (LANs) and/or wide area networks (WANs). Any number of nodes (e.g., distributed system servers) and client computing devices may be used to operate the analysis service system 200 within the scope of implementations of the present disclosure.

The analysis service system 200 may be supported by a cloud computing infrastructure (not shown). For example, the cloud computing infrastructure can implement components of the analysis service system 200 as a service in the cloud computing infrastructure. It is contemplated that components of the analysis service system 200 can also be implemented independently of the cloud computing infrastructure. The cloud computing infrastructure can include racks and clusters that define nodes that are utilized to store and provide access to data in the storage and compute of cloud computing infrastructure. The cloud computing infrastructure may be a public cloud, a private cloud, or a dedicated cloud. The cloud computing infrastructure may include a datacenter configured to host and support operation of endpoints in a particular application or service. The phrase "application" or "service" as used herein broadly refers to any software, or portions of software, that run on top of, or accesses storage and compute devices locations within, a datacenter.

Having described various aspects of the analysis service system 200, it is noted that any number of components may be employed to achieve the desired functionality within the scope of the present disclosure. Although the various components of FIG. 2 are shown with lines for the sake of clarity, in reality, delineating various components is not so clear, and metaphorically, the lines may more accurately be grey or fuzzy. Further, although some components of FIG. 2 are depicted as single components, the depictions are exemplary in nature and in number and are not to be construed as limiting for all implementations of the present disclosure.

With continued reference to FIG. 2, the direct relationship component 210 can be responsible for creating direct relationship objects (direct relationships) between tables. Direct relationships can be associated with the several properties. Direct relationship object properties can include active/inactive, endpoints, and cross-filter direction. Endpoints can also be associated with properties that include table, column, and cardinality. The cross filter direction element can indicate the direction(s) in which cross-filtering will occur across the relationship. Existing relationships may be configured to include a cross-filter direction element different from previous relationship definitions that were defined with a directional feature from the many end to the one end, and cross-filtering in the reverse direction, from the one end to the many end.

The filtering component 220 can be configured for setting the cross-filtering direction for more than one relationship. The filtering component 220 can be associated with a user interface component (not shown) of the analysis service that supports an interface where users can set the cross-filtering direction (as well as all other relationship properties) for a specific relationship quite easily. This provides a fine-grained granularity of control that allows the user to set any specific relationship property to any (valid) value at any time. The analysis service can provide a mechanism to set certain properties for multiple relationships. When changing multiple relationships in a single operation, the analysis service may not have fine-grained control over all the possible settings because: it can be challenging to design an easy-to-use experience for certain settings on multiple relationships; certain settings may not make sense in the context of multiple relationships; there exist no user demand for certain settings across multiple relationships. As such, it is contemplated that for any given set of relationships (or for all relationships) analysis service can have the ability to set cross-filtering to occur in both directions for all of the relationships.

The table importer component 220 can be configured for managing table relationships for imported tables. The table importer component 220 can access functionality of additional components described herein to support managing imported table relationships. When importing a set of tables from a relational database the table importer component 230 can cause a set of relationships to be imported along with those tables. In particular, the table importer component 230 can implement certain rules for setting the cross-filtering direction on the relationships to be imported. By way of example, relationships that are already in the model and that are not being imported will not be modified in any way. These relationships can retain whatever attributes they already have. If the table importer component can create the entire set of new relationships with bidirectional cross-filtering without encountering any ambiguous paths, table importer component will do so.

Creating relationships is based on a hierarchy of direct relationship creation choices. Creating relationships with bidirectional cross-filtering is the first choice when such relationships can be made to work successfully. If table importer component cannot create the entire set of new relationships with bidirectional cross-filtering without encountering ambiguous paths, then table importer component will try to create the set of new relationships with cross-filtering in one direction, such that the to-end cross-filters the from-end (one side filters the many side). If the table importer component can accomplish this without creating any ambiguous paths, the table importer component will do so. Creating relationships with one-directional cross-filtering is the second choice when the first choice cannot be made to work. If neither our first choice nor our second choice work, this means that the table importer component 230 will have at least one ambiguous path regardless of whether analysis service creates bidirectional or one-directional cross-filtering. In this case, the table importer component 230 may make all relationships bidirectional and then make some of those relationships inactive as needed to eliminate ambiguity. Creating inactive (bidirectional) relationships is the third choice when our first two choices (active bidirectional and active one-directional relationships) cannot be made to work. Whenever the table importer component is not able to implement the first choice, the table importer component will generate a warning in the user interface lets the user know that the system was unable to create active bidirectional relationships and that the user (data modeler) might want to use our modeling tools to modify various properties on the set of relationships that was just imported.

With reference to FIG. 3A, when the analysis service provides for slicing a measure in one table by a slicer from another table, there may be more than one path of relationships that could be followed by the cross-filtering. With the introduction of cross-filtering in multiple directions, the analysis service introduces new scenarios where cross-filtering could take multiple paths between any given pair of tables. The ambiguous paths component 240 is configured for handling ambiguous path scenarios. By way of example, the analysis service can build a measure on the Product table 310. It could be a count of Product ID, or a count of Product colors, or anything else that is based on the Product table data. A query for a count of the products can be generated. A pivot table having dates on the row labels, and put the count of Product measure on Values can be generated. The results are such that, for each date, the analysis service could calculate any of the following: the count of products sold; the count of products purchased; the count of products that were both sold and purchased; the count of products that were either sold or purchased. The scenario illustrated above has ambiguity as a direct result of supporting bidirectional cross-filtering.

Figure 3B:
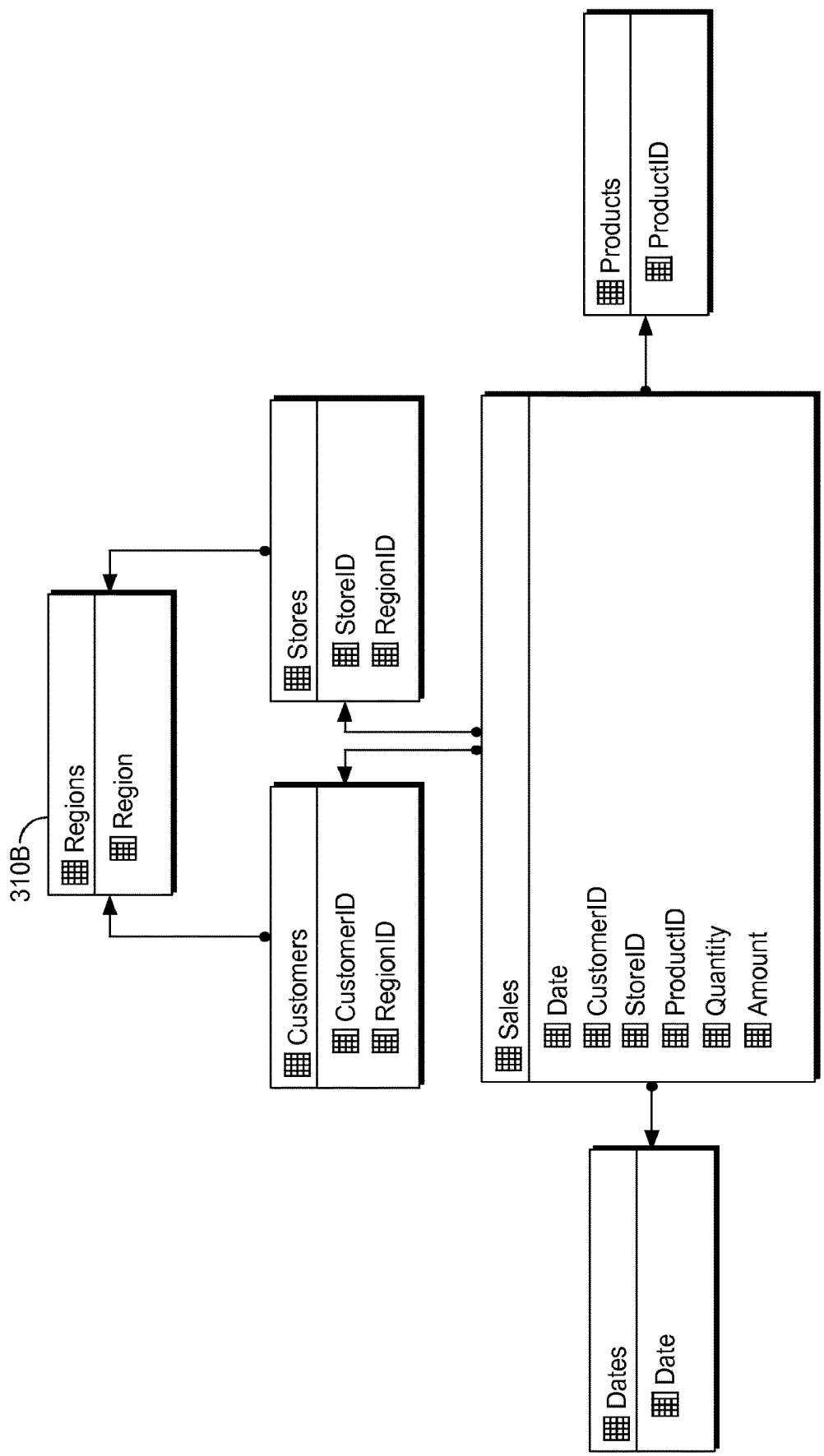

There exists a second scenario involving a diamond shaped schema where there might be an ambiguous path which does not depend on bidirectional cross-filtering. This second scenario exists whenever there is more than one path that can be followed from one table to another. With reference to FIG. 3B, consider the Regions table 310B. In this example, if a user wants to slice a measure on Sales such as SUM(Sales[Amount]) by Region, there is ambiguity because it is not clear if you want Sales for Stores in the specified Region, or if you want Sales for Customers in the specified Region.

Accordingly, the ambiguity path component 240 supports a set of rules to follow precisely the for resolving ambiguity in both types of scenarios, those that are the result of bidirectional cross filtering, and those that have nothing to do with cross-filtering direction. Advantageously the ambiguity path component 240 reduces the frequency with which users encounter ambiguity issues. In operation, relationships can be created as Active by default, even when this creates ambiguity. User may still explicitly make relationships inactive, but modeling clients may no longer do that by default. Instead, new relationships will always start out as Active. Cross-filtering will take place in the following way: when there is no ambiguity, and only one path exists for cross-filtering, the ambiguity path component will use it. When there exists ambiguity for any portion of the path between the table being aggregated and the table that contains the slicer/filter, then ambiguity path component determine whether there is a preferred path among the various choices. A path is preferred when it always flows from the table being aggregated to endpoints that have a cardinality of one. In other words, a preferred path goes only from many-to-one or from one-to-one when travelling from the table being aggregated to the slicer.

Further, if there is ambiguity, but only one preferred path, then ambiguity path component 240 can use the preferred path as the way that ambiguity path component 240 resolves the ambiguity. In other words, in cases where there are multiple paths, ambiguity path 240 component determines whether there is a single path that travels from the table being aggregated to the slicer following relationships only in the to one direction. If ambiguity path component 240 can find only one such path, ambiguity path component 240 will use it, ignoring other to many paths that might have been available. If there are multiple to one paths, or all paths involve a to-many traversal, then ambiguity path component will not be able to choose a disambiguating preferred path.

By way of example, using the model illustrated in FIG. 3A, would completely resolve ambiguity for a measure in Sales 320 that is being filtered by Product and/or by Date. It would also resolve ambiguity for a measure in Purchases 330 that is being filtered by Product and/or by Date. It would not resolve ambiguity for a measure in Product that is being filtered by Date. When step 2 above fails to resolve ambiguity, ambiguity path component will return an error result for the specific measure being evaluated.

During a modeling experience, when a schema/model has the potential for ambiguity, analysis service can make some sort of warning available somewhere in the user interface that will help the modeler to understand that there is potential for ambiguity. Ambiguity path component 240 can offer various suggestions that would reduce or eliminate ambiguity in the model. These suggestions might include any of the following (as appropriate for the given schema/model): Ambiguity path component 240 can provide a user interface that permits the modeler to specify the path to be used between a specific pair of tables, where the user specifies the table to be aggregated and the table containing the slicer. Change cross-filtering direction from bidirectional to one-directional to remove ambiguity. Split a table in two, with a separate relationship to each. An example would be to replace the Regions table with two tables, one for Store Region and one for Customer Region. Make one or more relationships inactive (or remove relationships).

During a reporting experience, when a user in a graphic user interface workflow is dragging fields onto a report, they may get an error result because they have chosen fields for which the cross-filtering paths are ambiguous. The ambiguity path component 240 determines potential designs for end user experiences that would assist the user in changing their report (or possibly the model, if the user has permissions to do so) in ways that would eliminate the ambiguity. For example, ambiguity path component 240 might suggest that the user use a different field in a different table to eliminate ambiguity.

Functions component 250 is responsible for supporting measure functions that function with direct relationship object defined with embodiments described herein. Functions that support Cross-Filtering include USERELATIONSH USERELATIONSHIP(<columnName1>,<columnName2>), where columnName1 indicates the name of an existing column that represents one of the relationship endpoints and columnName2 indicates the name of an existing column, that represents the other relationship endpoint. CROSSFILTER (<columnName1>,<columnName2>[, direction]), where columnName1 indicates the name of an existing column that represents one of the relationship endpoints and columnName2 indicates the name of an existing column. Direction indicates an optional integer enumeration that specifies the direction in which the cross-filtering is to take place. This argument may be supplied using either an integer or a keyword as specified in the following table. If this argument is omitted, CROSSFILTER will follow the behavior of option 0 (Both), cross-filtering in both directions.

| Integer Value | Keyword | Description |
|---|---|---|
| 0 | Both | If either table is filtered, the other table will be cross-filtered |
| 1 | OneWay | Cross-Filtering occurs in one direction only. If a Many-to-One relationship, the "One" side will cross-filter the "Many" side. If a One-to-One relationship, this selection will throw an error. |
| 2 | None | If either table is filtered, the other table will *not* be cross-filtered |
| 3 | Default | Use the Cross-Filtering property associated with the relationship in the schema |

The CROSSFILTER function may be used in precisely the same places that USERELATIONSHIP can be used. In particular, it can be used as a Filter argument to CALCULATE or CALCULATETABLE. It modifies the context in which a calculation is to be performed by changing the cross-filtering behavior of that context. The function CROSSFILTERALL( ) causes all relationships to be cross-filtered in both directions. The CROSSFILTERALL function may be used in precisely the same places that USERELATIONSHIP or CROSSFILTER can be used. In particular, it can be used as a Filter argument to CALCULATE or CALCULATETABLE. It modifies the context in which a calculation is to be performed by changing the cross-filtering behavior of that context.

It is contemplated that functions exist that traverse relationships or that rely on relationships whose behavior might be impacted by the introduction of many-to-many relationships and/or bidirectional cross-filtering. By way of example, ISCROSSFILTERED( )—This function's implementation can be modified to support the CrossFilterDirection property. RELATED( ) can only be used to traverse to an endpoint with cardinality=1. Analysis service can get a related value across a many-to-one relationship or across a one-to-one relationship, but not across a one-to-many relationship. From Sales analysis service can get RELATED (Product[column]) From Product analysis service cannot get RELATED (Sales[Column]) because it would return multiple values.

Just like RELATED( ), SUMMARIZE( ) can take GroupBy arguments that are either in the original table or related to that table with cardinality=One. Analysis service can use columns from tables on the other side of a many-to-one relationship or columns on the other side of a one-to-one relationship, but the analysis service cannot use columns from tables where there are potentially many rows in the other table for each row in the table analysis service are summarizing. For example, the analysis service cannot summarize the Product table using a GroupBy column from the Sales table.

ALL ( ) and ALLEXCEPT ( ) and ALLSELECTED ( ) in a system without bidirectional cross-filtering and cardinality options (where all relationships are directional from Many to One, and all cross-filtering is from One to Many,) when ALL (or ALLEXCEPT or ALLSELECTED) is applied to a table, and many-to-one relationships exist from that table, the function is also applied to the related tables. In other words, ALL(Sales) causes the system to also perform ALL(Customer), ALL(Product), and ALL(Date). Note that ALL (Product) does not cause the system to perform ALL (Sales)—the flow is only from the Many side of the relationship to the One side.

With the new bidirectional cross-filtering and cardinality options, an analysis service will do something quite similar to what analysis services have today. When ALL (or ALLEXCEPT or ALLSELECTED) is applied to a table, analysis service will look at the relationships and will consider applying the function to the other related tables as follows: (1) When there is a many-to-one relationship, using ALL (table) on the Many side will also apply ALL to the table on the One side. Analysis service will do this regardless of whether cross-filtering is one-directional or bidirectional. (2) When there is a one-to-one relationship, using ALL (table) on either side will also apply ALL to the table on the other side. Analysis service will do this regardless of whether cross-filtering is one-directional or bidirectional.

There are two distinct behaviors here based on the usage of these functions. When analysis service are clearing filters in the filter context, analysis service remove filters on the table specified as well as on the other tables that are to be impacted based on the rules above. When an analysis service is simply constructing a table expression (to be used as input to additional calculations) analysis service ignores all filters because there are no external filters being applied to the specified table. In this example, that analysis service does not remove filters on the related tables. When the analysis service uses ALLEXCEPT as a table expression and there is no direct relationship between the table in the first argument and the column mentioned as a subsequent argument, then this function will return an error. In other words, ALLEXCEPT (Sales, Warehouse[Name]) will throw an error when Warehouse is not directly related to Sales and when the function is being used as a table expression. This expression is still valid when used as a setfilter argument to CALCULATE.

Figure 5A:
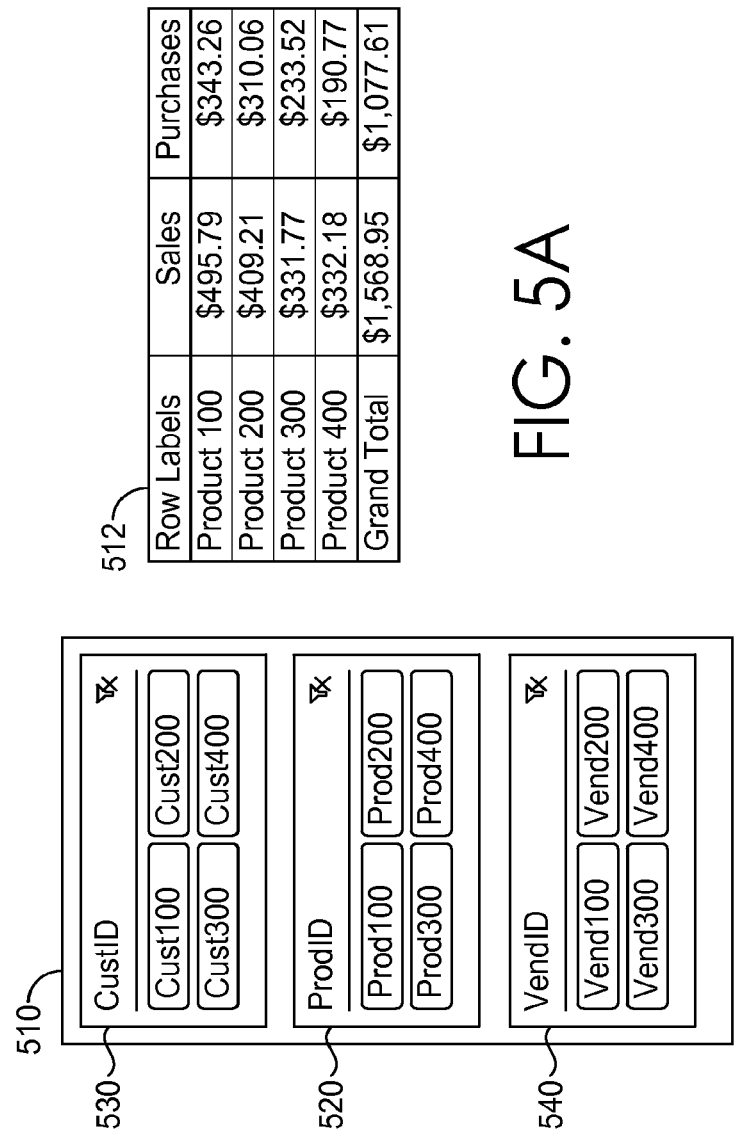

With reference to FIGS. 4 and 5A-B, the cross-filtering direction use case is illustrated. Using many-to-one relationships with automatic cross-filtering in only one direction can cause users to get unexpected results. FIG. 4 [Placeholder]—By enabling cross-filtering in multiple directions, the analysis service enables users to get the results they expect. Based on data in FIG. 4, associated with FIGS. 5A-B, the analysis service can build an exemplary table slicer interface 510 and table 512 (e.g., pivot table) as shown. Clicking on the ProdID 520 slicer gets the expected results, because the Product table is related to both Sales and Purchases, as discussed in FIG. 1A. Clicking on the CustID 530 or VendID 540 slicers only impacts one of the measures and not the other. This might be what the user expects, or it might not. If the user toggles the cross-filtering state to a mode where filters cross-filter all other tables, then these slicers would impact both measures, which is what many of our users will expect.

Further, FIG. 5B illustrates additional examples of what happens when the user builds pivot tables using fields from tables that have a conceptual many-to-many relationship, and how the wrong results can be easily fixed up by toggling the cross-filtering state (or by establishing cross-filtering in both directions). With reference to table 550 and table 560, table 550 is counting all the colors in the product table without applying any cross-filtering at all. The customers do not all purchase all products and do not purchase products of all colors. When cross-filtering is applied, a count is correctly determined for the products, as shown in table 560, for products that remain after cross-filtering. For example, when a customer buy products in three colors, the count show the correct number as three colors. With reference to table 570 and table 580, the sample set includes four vendors and four customers. When no cross-filtering is performed, the same number of customers and vendors are returned for products regardless of how the product is filtered. For a selected product, cross-filtering to show the count of customer who bought the selected product and vendors who sold the selected product can be performed based on selecting (filter) the product table as a cross-filter to be applied to the related tables.

Figure 6A:
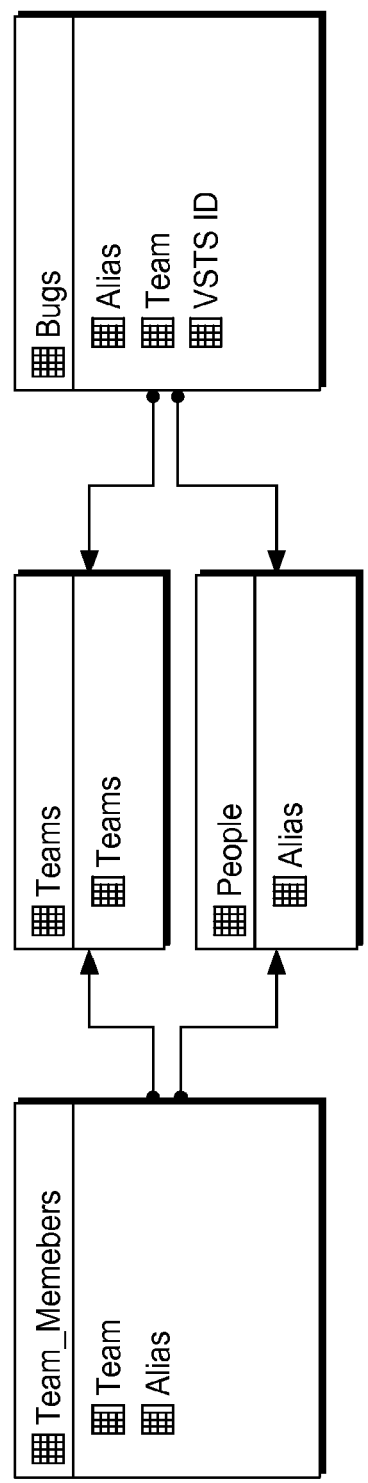
FIGS. 6A and 6B illustrate a schema for a method of cross-filtering based on configurable direct relationships, in accordance with embodiments described herein.
Figure 6B:
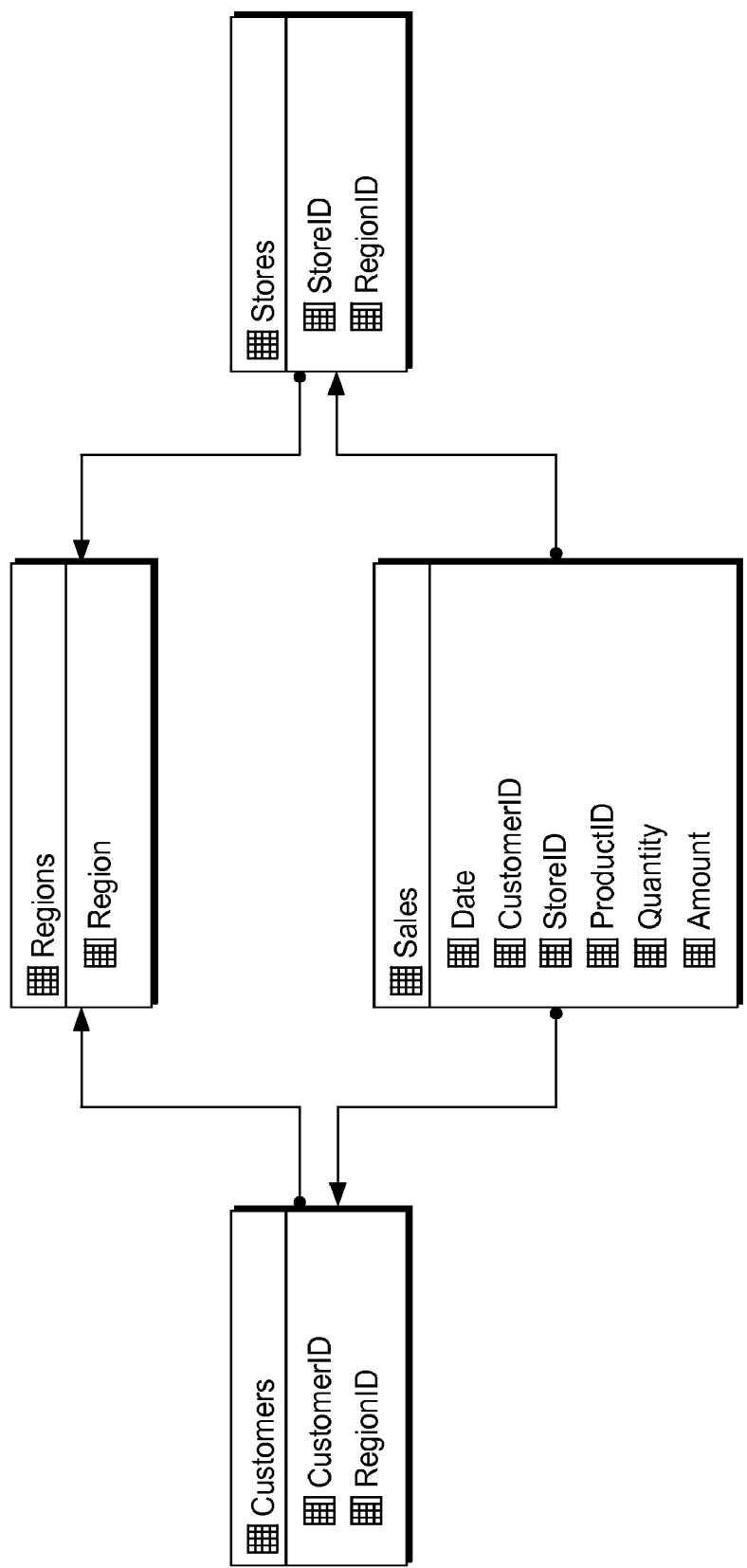

With reference to FIGS. 6A and 6B, cross-filtering path ambiguity use cases are illustrated. The analysis service can support schemas that include cross-filtering in both directions, which results in additional cases where the path to be followed from one table to another is ambiguous. For example, consider the simple example where the analysis service has two fact tables and where the two fact tables are each related to the same two dimensions. This can occur in many user scenarios, for example, imagine two transaction tables, each sliced both by date and by product.

Turning to FIG. 6A, if the analysis service turns on cross-filtering in both directions, then a selection of a Team would cause People to be filtered, but this could happen in two ways, either through the Bugs table or through the Team_Members table. Embodiments described herein can be configured to address such ambiguity by having the analytic service do the following: (1) Choose one of the paths where the system uses a preference of to-one relationships; and (2) when there is no preferred path, the analysis service can generate an error that explains the ambiguity.

Turning to FIG. 6B, a preference for paths that flow through a fact (transaction) table is illustrated. By way of example, a user may want to show for each customer, the count of stores associated with that customer. The inquiry is ambiguous, because the user might want either of the following: count the stores in the same region as the customer, or, count the stores where the customer had a sales transaction. Similarly, a user may want to show for each store, the count of customers associated with that store. This inquiry is also ambiguous, because the user might want either of the following: count the customers in the same region as the store, or, count the customers who had a sales transaction in the store.

Embodiments described herein can implement a preference to disambiguate by going through the fact/transaction table (in this case the Sales table) instead of choosing a path through the dimension table (in this case the Regions table). We can identify the transaction table because it is on the many-side of its relationships, whereas the dimension table is on the one-side of the relationships in which it participates. FIG. 6B illustrates lines arrows from the many-side to the one-side. By implementing this rule, the analysis service can provide a valid result in a PivotTable in a consistent way, even when the schema is somewhat ambiguous. This can be done only when there is a single path through a fact table. If there are ambiguous paths through two fact tables, the analytics service does not have a way to choose one over the other.

Figure 7:
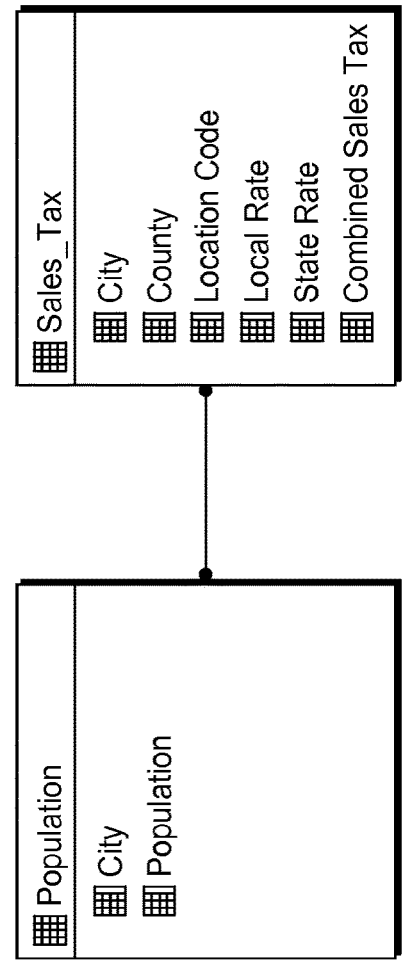
FIG. 7 illustrates a one-to-one relationship between two tables cross-filtered on either side of the tables, in accordance with embodiments described herein.

With reference to FIG. 7A, an illustration of a one-to-one relationship is provided. There are many occasions when a user finds a table of data in one place (e.g., from a corporate database or from the internet) and another table of data on the same subject matter from some other location. For example, the tables can relate to cities in the state of Washington and their population data as well as sales tax rates for each city. A first table can include City and Population for the cities and the second table can include City, County, Location Code, Local Rate, State Rate, and Combined Sales Tax. Figuring out how to combine such data is challenging given that cities in one table may not appear in the other table. However, as the example illustrates, with embodiments described herein, a user can construct a direct one-to-one relationship between the tables and cross-filter them in both directions.

Turning now to FIG. 8, a flow diagram is provided that illustrates a method 400 for cross-filtering. Initially at block 810, a selection of a first endpoint of a first table and a second endpoint of a second table are received. At block 820, a direct relationship object between the first table and the second table based on the first endpoint and the second endpoint is defined. At block 830, a cross-filtering direction of the direct relationship object is configured, such that, cross-filtering the first table and the second table to select rows for cross-filtering results is based on the cross-filtering direction, where the first endpoint and the second point comprise corresponding endpoint cardinality settings.

Turning now to FIG. 9, a flow diagram is provided that illustrates a method 900 for cross-filtering based on configurable direct relationships. Initially at block 910, a direct relationship object between a first table and a second table is accessed. The direct relationship object comprising a configurable cross-filtering direction. At block 920, the first table and the second table are cross-filtered based on the direct relationship object and the configurable cross-filtering direction, where cross-filtering comprises selecting one or more rows of the first table, and where selecting the one or more rows is based on a filter in a second table, where the filter corresponds to a column value. At block 930, the one or more rows of the first table are communicated for display as cross-filtering results.

Having briefly described an overview of embodiments of the present invention, an exemplary operating environment in which embodiments of the present invention may be implemented is described below in order to provide a general context for various aspects of the present invention. Referring initially to FIG. 10 in particular, an exemplary operating environment for implementing embodiments of the present invention is shown and designated generally as computing device 1000. Computing device 1000 is but one example of a suitable computing environment and is not intended to suggest any limitation as to the scope of use or functionality of the invention. Neither should the computing device 1000 be interpreted as having any dependency or requirement relating to any one or combination of components illustrated.

The invention may be described in the general context of computer code or machine-useable instructions, including computer-executable instructions such as program modules, being executed by a computer or other machine, such as a personal data assistant or other handheld device. Generally, program modules including routines, programs, objects, components, data structures, etc. refer to code that perform particular tasks or implement particular abstract data types. The invention may be practiced in a variety of system configurations, including hand-held devices, consumer electronics, general-purpose computers, more specialty computing devices, etc. The invention may also be practiced in distributed computing environments where tasks are performed by remote-processing devices that are linked through a communications network.

With reference to FIG. 10, computing device 1000 includes a bus 1010 that directly or indirectly couples the following devices: memory 1012, one or more processors 1014, one or more presentation components 1016, input/output ports 1018, input/output components 1020, and an illustrative power supply 1022. Bus 1010 represents what may be one or more busses (such as an address bus, data bus, or combination thereof). Although the various blocks of FIG. 10 are shown with lines for the sake of clarity, in reality, delineating various components is not so clear, and metaphorically, the lines would more accurately be grey and fuzzy. For example, one may consider a presentation component such as a display device to be an I/O component. Also, processors have memory. We recognize that such is the nature of the art, and reiterate that the diagram of FIG. 10 is merely illustrative of an exemplary computing device that can be used in connection with one or more embodiments of the present invention. Distinction is not made between such categories as "workstation," "server," "laptop," "hand-held device," etc., as all are contemplated within the scope of FIG. 10 and reference to "computing device."

Computing device 1000 typically includes a variety of computer-readable media. Computer-readable media can be any available media that can be accessed by computing device 1000 and includes both volatile and nonvolatile media, removable and non-removable media. By way of example, and not limitation, computer-readable media may comprise computer storage media and communication media.

Computer storage media include volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computing device 100. Computer storage media excludes signals per se.

Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 1012 includes computer storage media in the form of volatile and/or nonvolatile memory. The memory may be removable, non-removable, or a combination thereof. Exemplary hardware devices include solid-state memory, hard drives, optical-disc drives, etc. Computing device 1000 includes one or more processors that read data from various entities such as memory 1012 or I/O components 1020. Presentation component(s) 1016 present data indications to a user or other device. Exemplary presentation components include a display device, speaker, printing component, vibrating component, etc.

I/O ports 1018 allow computing device 1000 to be logically coupled to other devices including I/O components 1020, some of which may be built in. Illustrative components include a microphone, joystick, game pad, satellite dish, scanner, printer, wireless device, etc.

Embodiments presented herein have been described in relation to particular embodiments which are intended in all respects to be illustrative rather than restrictive. Alternative embodiments will become apparent to those of ordinary skill in the art to which the present invention pertains without departing from its scope.

From the foregoing, it will be seen that this invention in one well adapted to attain all the ends and objects hereinabove set forth together with other advantages which are obvious and which are inherent to the structure.

It will be understood that certain features and sub-combinations are of utility and may be employed without reference to other features or sub-combinations. This is contemplated by and is within the scope of the claims.

The invention claimed is:

1. One or more computer storage media having computer-executable instructions embodied thereon that, when executed, by one or more processors, causes the one or more processors to perform a method for cross-filtering based on configurable direct relationships, the method comprising:
   receiving a selection of a first endpoint of a first table and a second endpoint of a second table;
   defining a direct relationship object between the first table and the second table based on the first endpoint and the second endpoint, wherein the direct relationship object supports a plurality of configurable direct relationships in one or more directions, wherein the direct relationship object is accessible to support automatically cross-filtering the first table and the second table when executing a filtering operation; and
   configuring a cross-filtering direction of the direct relationship object, such that, cross-filtering the first table and the second table to select rows for cross-filtering results of filtering operations is based on the cross-filtering direction.

2. The media of claim 1, wherein the direct relationship between the first table and the second table is selected from one of: one-to-one; many-to-one; and one-to-many.

3. The media of claim 1, wherein the direct relationship is associated with a condition-based cross-filtering relationship setting, wherein the condition-based cross-filtering relationship comprises one of: when the first table is filtered, the second table is cross-filtered; when the second table is filtered, the first table is cross-filtered; and when either the first table or the second table is filtered, the first table and the second table are cross-filtered.

4. The media of claim 1, wherein each endpoint is configurable as a unique value or duplicate values., wherein a second endpoint has a cardinality of one when the direct relationship maps any value from the first endpoint to a single value in the second endpoint, and wherein the second endpoint has a cardinality of many when the direct relationship maps any value from the first endpoint to more than one value in the second endpoint.

5. The media of claim 1, wherein the direct relationship exist without a directional attribute.

6. The media of claim 1, wherein the configurable cross-filtering direction is based on a cross-filter direction element that indicates a direction in which cross-filter occurs across a direct relationship, wherein the cross-filter direction element is one of: a forward direction, a reverse direction, or a bi-direction.

7. The media of claim 1, wherein the direct relationship comprising the cross-filtering direction and endpoint cardinality settings are comprised in a database schema definition.

8. A computer-implemented method for cross-filtering based on configurable direct relationships, the method comprising:
   accessing a direct relationship object between a first table and a second table, wherein the direct relationship object comprises a configurable cross-filtering direction and supports a plurality of configurable direct relationships in one or more directions, wherein the direct relationship object is accessible to support automatically cross-filtering the first table and the second table when executing a filtering operation;
   cross-filtering the first table and the second table based on the direct relationship object and the configurable cross-filtering direction, wherein cross-filtering comprises selecting one or more rows of the first table, wherein selecting the one or more rows is based on a filter of filtering operations in a second table, wherein the filter corresponds to a column value; and
   communicating the one or more rows of the first table.

9. The method of claim 8, wherein the direct relationship object is configured based on:
   receiving a selection of a first endpoint of the first table and a second endpoint of the second table;
   defining a direct relationship object between the first table and the second table based on the first endpoint and the second endpoint, and
   configuring a cross-filtering direction of the direct relationship object, wherein the first endpoint and the second point comprise corresponding endpoint cardinality settings.

10. The method of claim 8, wherein the direct relationship is associated with a formula-based condition-based cross-filtering relationship setting, wherein the condition-based cross-filtering relationship comprises one of: (1) when the first table is filtered, the second table is cross-filtered; when the second table is filtered, the first table is cross-filtered; (2) when either the first table or the second table is filtered, the first table and the second table are cross-filtered; and (3) when the first table or the second table is filtered, the first table or second table will not be cross-filtered, and the cross-filtering setting associated with relationship is utilized.

11. The method of claim 10, wherein when the first table or the second table is filtered, the first table or second table will not be cross-filtered, and the cross-filtering setting associated with relationship is utilized, condition-based cross-filtering settings are configurable exclusively using measure formulas.

12. The method of claim 8, wherein a query includes a cross-filtering setting configured for a defined duration of the query, wherein a query duration-based cross-filtering setting is configured based on invoking a selected function.

13. The method of claim 8, wherein the direct relationship is configured when creating a relationship between the first table and the second table, wherein bidirectional cross-filtering is a default setting for the relationship between the first table and the second table.

14. The method of claim 8, wherein a default cross-filtering setting is overridden based on invoking a selected function to set the condition-based cross-filtering relationship setting to a selected cross-filtering relationship setting.

15. The method of claim 8, wherein path ambiguity in a cross- filtering operation is resolved based on at least one of the following actions:
    identifying a first path based on a preference for a to-one relationship; or
    identifying the first path based on a preference for paths that flow through a fact table.

16. A system for cross-filtering, the system comprising:
    a direct relationship component configured for:
    receiving a selection of a first endpoint of a first table and a second endpoint of a second table;
    defining a direct relationship object between the first table and the second table based on the first endpoint and the second endpoint, wherein the direct relationship object supports a plurality of configurable direct relationships in one or more directions, wherein the direct relationship object is accessible to support automatically cross-filtering the first table and the second table when executing a filtering operation; and
    configuring a cross-filtering direction of the direct relationship object ,such that cross-filtering the first table and the second table to select rows for cross-filtering results of filtering operations is based on the cross-filtering direction; and
    a filtering component configured for:
    accessing the direct relationship object between a first table and a second table;
    cross-filtering the first table and the second table based on the direct relationship object and the configurable cross-filtering direction, wherein cross-filtering comprises selecting one or more rows of the first table, wherein selecting the one or more rows is based on a filter in a second table, wherein the filter corresponds to a column value.
    communicating the one or more rows of the first table.

17. The method of claim 16, wherein the direct relationship is associated a condition-based cross-filtering relationship setting, wherein the condition-based cross-filtering relationship comprises one of: when the first table is filtered, the second table is cross-filtered; when the second table is filtered, the first table is cross-filtered; when either the first table or the second table is filtered, the first table and the second table are cross-filtered; when the first table or the second table is filtered, the first table or second table will not be cross-filtered, and the cross-filtering setting associated with relationship is utilized.

18. The system of claim 16 further comprising a table importer component configured for:
    causing a set of relationships to be imported for a set of imported tables using rules that define cross-filtering directions for the set of relationships, wherein the rules are based on a hierarchy of direct relationship creation choices; and
    creating relationships based on the hierarch of direct relationship creation choices, wherein the hierarchy of direct relationship choices comprise:
    a first choice to create relationships with bidirectional cross-filtering;
    a second choice to create relationships with cross-filtering in one direction such that the to-end cross-filters the from-end; and
    a third choice to create all bidirectional relationships and define one or more of the relationships as inactive as needed to eliminate ambiguity.

19. The system of claim 16 further comprising an ambiguous path component configured for:
    determining a preferred path for cross-filtering, wherein a preferred path flow from a table being aggregated to endpoints that have a cardinality of one.

20. The system of claim 16 further comprising a functions component configured for:
    providing measure functions that operate with the direct relationship object, wherein measure functions, wherein the functions include expressions that represent direct relationship properties.

* * * * *